US012771204B2

(12) United States Patent
Kee

(10) Patent No.: US 12,771,204 B2
(45) Date of Patent: Oct. 20, 2026

(54) ACCESS COVER FOR HIGH VOLTAGE SYSTEM

(71) Applicant: Schaeffler Technologies AG & Co. KG, Herzogenaurach (DE)

(72) Inventor: Noah Kee, Rittman, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 269 days.

(21) Appl. No.: 18/615,306

(22) Filed: Mar. 25, 2024

(65) Prior Publication Data

US 2025/0300520 A1 Sep. 25, 2025

(51) Int. Cl.
*H02K 5/22* (2006.01)
*H02K 5/00* (2006.01)

(52) U.S. Cl.
CPC .................................... *H02K 5/225* (2013.01)

(58) Field of Classification Search
CPC ................................. H02K 5/255; H02K 5/00
USPC ...................................................... 310/89, 71
See application file for complete search history.

(56) References Cited

U.S. PATENT DOCUMENTS 5,885,423 A * 3/1999 Guyot ...................... H10P 72/72 118/728
2015/0035399 A1* 2/2015 Sakaguchi ............... B60K 1/04 310/89

FOREIGN PATENT DOCUMENTS

| | | | | | |
|---|---|---|---|---|---|
| CN | 213692369 | U | * | 7/2021 | |
| CN | 215898338 | U | * | 2/2022 | |
| DE | 102011004625 | A1 | * | 8/2012 | ......... H05K 7/14322 |
| DE | 102022113963 | A1 | * | 12/2023 | ................ B60L 3/04 |
| EP | 3993585 | A1 | * | 5/2022 | ............. H02K 5/225 |
| WO | WO-2013015396 | A1 | * | 1/2013 | ......... H01R 13/6592 |

* cited by examiner

*Primary Examiner* — Jose A Gonzalez Quinones
(74) *Attorney, Agent, or Firm* — Sulter Swantz IP

(57) ABSTRACT

An access cover of a high voltage system of an electric vehicle may include a plate and a receiver. The access cover may provide mechanical high voltage access safety to a high voltage system. The high voltage system may include the access cover covering a high voltage circuit disposed within a housing. The receiver of the access cover may couple between a low voltage connector and a low voltage plug. The low voltage connector may provide signals to an interlock circuit via the low voltage plug while the low voltage plug is coupled to the low voltage connector. The low voltage plug may be uncoupled from the low voltage connector before the access cover can be uncoupled from the housing. The interlock circuit may prevent power from being supplied to the high voltage circuit when the low voltage plug is uncoupled from the low voltage connector.

20 Claims, 18 Drawing Sheets

200

200

404

ACCESS COVER FOR HIGH VOLTAGE SYSTEM

TECHNICAL FIELD

The present disclosure generally relates to high voltage electrical connectors, and, more particularly, to covers for high voltage electrical connectors.

BACKGROUND

High voltage electrical connections are used in several direct current and three-phase electric machines. The high voltage electrical connections may be adapted for repeated engagement and disengagement during assembly and maintenance. One challenge with the high voltage electrical connections is preventing access to the high voltage electrical connections while a voltage is applied across the high voltage electrical connections while also allowing access to the high voltage electrical connections when voltage is not applied. Therefore, it would be advantageous to provide a device, system, and method that cures the shortcomings described above.

SUMMARY

An access cover is described, in accordance with one or more embodiments of the present disclosure. The access cover may include: a plate defining a plurality of through holes; and a receiver defining a through slot, wherein the receiver is offset from the plate, wherein the plate and the receiver define opposing ends of the access cover.

In some aspects, the through slot is a linear through slot.

In some aspects, the through slot is the linear through slot with a pair of fillet corners.

In some aspects, the plurality of through holes are counterbore through holes.

In some aspects, the access cover may include: an L-bend, wherein the L-bend extends from the plate; and a vertical leg; wherein the vertical leg extends from the L-bend, wherein the L-bend joins the plate to the vertical leg; wherein the receiver extends from the vertical leg, wherein the vertical leg joins the L-bend to the receiver, wherein the receiver is offset from the plate by the L-bend and the vertical leg.

In some aspects, the vertical leg is orthogonal to the plate.

In some aspects, the receiver is parallel to the plate and orthogonal to the vertical leg.

In some aspects, the vertical leg is an arched surface.

In some aspects, the plate, the L-bend, and the vertical leg include a uniform thickness.

In some aspects, the access cover comprises a first member and a second member; the first member comprising the plate; the second member comprising the L-bend, the vertical leg, and the receiver; wherein the first member is coupled to the second member; wherein the plurality of through holes are a first plurality of through holes; wherein the L-bend defines a second plurality of through holes; wherein the second plurality of through holes are aligned with at least some of the first plurality of through holes.

In some aspects, the L-bend defining a second through slot.

A high voltage system is described, in accordance with one or more embodiments of the present disclosure. The high voltage system may include: an access cover including: a plate defining a plurality of through holes; and a receiver defining a through slot, wherein the receiver is offset from the plate, wherein the plate and the receiver define opposing ends of the access cover; an electric motor; a high voltage circuit; and a housing including a connector housing and a low voltage connector, wherein the connector housing houses the high voltage circuit, wherein the through slot receives the low voltage connector, wherein the plate couples to the connector housing and covers the high voltage circuit.

In some aspects, the electric motor is a three-phase electric motor.

In some aspects, the high voltage system includes a plurality of fasteners, wherein the plurality of fasteners couple the access cover to the connector housing through the plurality of through holes.

In some aspects, the low voltage connector is disposed adjacent to the connector housing.

In some aspects, the high voltage system includes a low voltage plug, wherein the low voltage plug couples to the low voltage connector, wherein the receiver couples between the low voltage connector and the low voltage plug thereby preventing uncoupling of the plate from the connector housing; wherein the low voltage plug is configured to uncouple from the low voltage connector thereby permitting the plate to uncouple from the connector housing.

In some aspects, the high voltage system includes a power electronics unit, wherein the high voltage circuit couples the power electronics unit and the electric motor, the power electronics unit including an interlock circuit, wherein the interlock circuit is configured to receive one or more signals from the low voltage connector via the low voltage plug; wherein the interlock circuit prevents the power electronics unit from supplying power to the high voltage circuit when the low voltage plug is uncoupled from the low voltage connector.

In some aspects, the housing includes a motor housing which houses the electric motor; the connector housing and the low voltage connector extend from the motor housing.

In some aspects, the high voltage system includes: a delay plate; wherein the delay plate is disposed within the connector housing.

A method is described, in accordance with one or more embodiments of the present disclosure. The method may include: uncoupling a low voltage plug from a low voltage connector of a housing, wherein the housing includes a connector housing and the low voltage connector; uncoupling a plurality of fasteners from a plate of an access cover and the connector housing, wherein the access cover includes the plate defining a plurality of through holes; and a receiver defining a through slot, wherein the receiver is offset from the plate, wherein the plate and the receiver define opposing ends of the access cover, wherein the plurality of fasteners are uncoupled from the plate by removing the plurality of fasteners from the plurality of through holes; and uncoupling the plate from the connector housing to uncover a high voltage circuit housed within the connector housing, wherein the plate is uncoupled from the connector housing in response to uncoupling the low voltage plug from the low voltage connector and in response to uncoupling the plurality of fasteners from the plate and the connector housing.

BRIEF DESCRIPTION OF THE DRAWINGS

The numerous advantages of the disclosure may be better understood by those skilled in the art by reference to the accompanying figures in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

Embodiments of the present disclosure are directed to an access cover of a high voltage system of an electric vehicle. The access cover may include a plate and a receiver. The access cover may mechanically provide access safety to a high voltage system. The high voltage system may include the access cover covering a high voltage circuit disposed within a housing. The receiver of the access cover may couple between a low voltage connector and a low voltage plug. The low voltage connector may provide signals to an interlock circuit via the low voltage plug while the low voltage plug is coupled to the low voltage connector. The low voltage plug may be uncoupled from the low voltage connector before the access cover may be uncoupled from the housing. The interlock circuit may prevent power from being supplied to the high voltage circuit when the low voltage plug is uncoupled from the low voltage connector.

Figure 1:
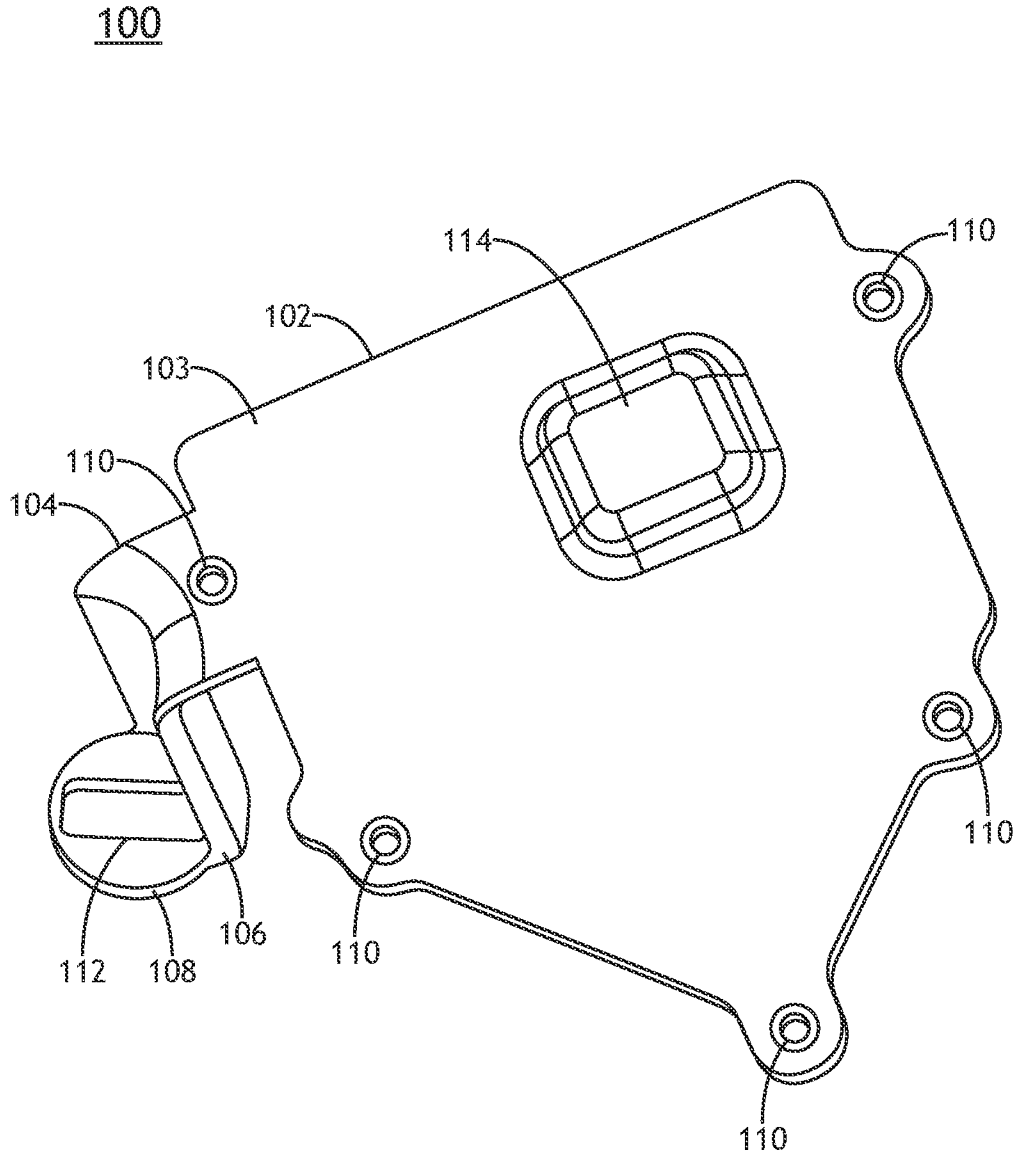
FIG. 1 illustrates a perspective view of an access cover for a high voltage system of an electric vehicle, in accordance with one or more embodiments of the present disclosure.

FIG. 1 illustrates an access cover 100 of a high voltage system for use in an electric vehicle, in accordance with one or more embodiments of the present disclosure. The access cover 100 may include a plate 102, an L-bend 104, a vertical leg 106, a receiver 108, and/or a raised feature 114.

The plate 102 may be a planar member. The plate 102 may be flat along a horizontal plane of the access cover 100. The plate 102 may include a uniform thickness, such that the plate 102 may be thinner than wide or long. The plate 102 may not include any significant curvature along a horizontal plane. The plate 102 may include a shape, such as, but not limited to, a pentagon shape (e.g., a house-shaped pentagon shape with two sides which are arranged in parallel). The plate 102 may include one or more corners. The one or more corners may include a sharp edge, fillet, chamfer, or the like.

The plate 102 may define through holes 110. The plate 102 may define the through holes 110 through the thickness of the plate 102. The plate 102 may define any integer number of the through holes 110. For example, the plate 102 may define five of the through holes 110. The plate 102 may define the through holes 110 around an outer perimeter of the plate 102. For example, the through holes 110 may be defined at one or more corners of the plate 102 and/or at one or more edges between the corners.

The through holes 110 may include any suitable cross-section. For example, the through holes 110 may include a circular cross-section (i.e., cylindrical through holes), a rectangular cross-section (i.e., rectangular through holes), or any n-agonal cross-section where N is an integer of three or greater (i.e., n-agonal through holes).

The plate 102 may define the through holes 110 as plain through holes, counterbore through holes, and/or countersink through holes. Plain through holes may refer to through holes without a counterbore and without a countersink. The counterbore and/or countersink may be from a top surface 103 of the plate 102. For example, the plate 102 may define the through holes 110 as counterbore through holes from the top surface 103 of the plate 102.

The L-bend 104 may extend from the plate 102. For example, the L-bend 104 may extend from an edge of the plate 102. The L-bend 104 may be bent with a selected angle. The L-bend 104 may have an angle which is approximately 90-degrees. For example, the L-bend 104 may have a 90-degree bend. It is further contemplated that the L-bend 104 may vary from the 90-degree bend, without exceeding the scope of the present disclosure.

The vertical leg 106 may extend from the L-bend 104. The L-bend 104 may join the plate 102 to the vertical leg 106. The vertical leg 106 may be orthogonal to the plate 102. For example, the vertical leg 106 may be orthogonal to the plate 102 by the L-bend 104 having the 90-degree bend.

The vertical leg 106 may be an arched surface. For example, the vertical leg 106 may be the arched surface along an entire length of the vertical leg 106 between the L-bend 104 and the receiver 108. The arched surface may be arched with a select radius. The select radius of the arched surface may or may not vary along the length of the vertical leg 106. For example, the arched surface may include a uniform radius along the length of the vertical leg 106.

The receiver 108 may extend from the vertical leg 106. The vertical leg 106 may join the L-bend 104 to the receiver 108. The plate 102 and the receiver 108 may be define the opposing ends of the access cover 100.

The receiver 108 may be a planar member. The receiver 108 may be flat along a horizontal plane of the access cover 100. The receiver 108 may include a uniform thickness, such that the receiver 108 may be thinner than wide or long. The receiver 108 may not include any significant curvature along the horizontal plane. The receiver 108 may include a shape, such as, but not limited to, a circular shape.

The receiver 108 may be offset from the plate 102. For example, the receiver 108 and the plate 102 may be disposed in offset planes. The receiver 108 may be offset from the plate 102 by the L-bend 104 and the vertical leg 106. For example, the receiver 108 may be offset from the plate 102 a select distance based on the length of the L-bend 104 and/or the vertical leg 106.

The receiver 108 may be orthogonal to the vertical leg 106. The receiver 108 may be parallel to the plate 102.

The receiver 108 may define a through slot 112. The through slot 112 may be defined through a thickness of the receiver 108. The through slot 112 may include any suitable shape, such as, but not limited to, a linear through slot. The linear through slot may follow a straight line along a portion of the length of the receiver 108. The through slot 112 may include a pair of ends. The pair of ends may include fillet corners. The through slot 112 may be a linear through slot with a pair of fillet corners.

The raised feature 114 may be raised from the plate 102. The raised feature 114 may be raised from the top surface 103 of the plate 102. The raised feature 114 may be raised offset from a midpoint of the top surface 103 of the plate 102. The raised feature 114 and the plate 102 may be joined by one or more edges. For example, the raised feature 114 and the plate 102 may be joined by one or more fillet edges, chamfer edges, or the like. The raised feature 114 may include a shape, such as, but not limited to, a rounded rectangle. The raised feature 114 may be parallel to the plate 102 and/or the receiver 108.

The plate 102, the L-bend 104, the vertical leg 106, the receiver 108, and/or the raised feature 114 may include a select thickness. For example, the plate 102, the L-bend 104, the vertical leg 106, the receiver 108, and/or the raised feature 114 may include a uniform thickness. It is further contemplated that the thickness of the access cover 100 may vary slightly due to bend radiuses when manufacturing the access cover 100. For instance, elongation due to bending during manufacturing may reduce the thickness of the L-bend 104, the thickness of the receiver 108, and/or the thickness of the raised feature 114 relative to the thickness of the plate 102.

The access cover 100 may be formed from a selected material. The selected material may include but is not limited to aluminum, steel, plastic, or the like. For example, the access cover 100 may be an aluminum access cover. The aluminum access cover may provide minimal corrosion when abutting with aluminum components. By way of another example, the access cover 100 may be a steel high voltage component with a corrosion-prevention coating. The corrosion-prevention coating may reduce corrosion when abutting with aluminum components. By way of another example, the access cover 100 may be a plastic high voltage component.

The access cover 100 may be manufactured via one or more processes. The access cover 100 may be manufactured via stamping, casting, injection molding, or the like. For example, the access cover 100 may be a stamped aluminum access cover. The L-bend 104 and/or receiver 108 may be bent from an aluminum sheet during stamping to define the L-bend 104, the receiver 108, and/or the raised feature 114. For instance, the L-bend 104, the receiver 108, and/or the raised feature 114 may stamped from the sheet and bent to form the L-bend 104, the receiver 108, and/or the raised feature 114.

FIGS. 2A-2G illustrate a high voltage system 200, in accordance with one or more embodiments of the present disclosure. The high voltage system 200 may be a high voltage power system. The high voltage system 200 may include the access cover 100, a housing 202, a power electronics unit 204 (PEU), an electric motor 206, a low voltage plug 208, fasteners 212, and/or a high voltage circuit 214.

The electric motor 206 may receive one or more phases of current. For example, the electric motor 206 may be a three-phase electric motor and may receive three phases of current, including first-phase (u), second-phase (v), and third-phase (w). The first-phase (u), the second-phase (v), and the third-phase (w) are generally aligned 120-degrees out of phase. By way of another example, the electric motor 206 may be a two-phase electric motor and may receive two phases of current. By way of another example, the electric motor 206 may be a single-phase electric motor and may receive a single phase of current. By way of another example, the electric motor 206 may be receive a direct current (DC) electric motor and receive current which does not oscillate with a phase.

The electric motor 206 may include a stator, rotor, and the like. The rotor may be configured to rotate relative to the stator. The stator may include one or more windings (e.g., hairpin windings).

The electric motor 206 may include one or more functions. For example, the electric motor may be a traction drive in a vehicle powertrain or the like.

The power electronics unit 204 may control the current supplied to the electric motor 206, thereby controlling a revolutions per minute of the electric motor 206. For example, the power electronics unit 204 may include an inverter, controller, or the like for controlling the current supplied to the electric motor 206.

The power electronics unit 204 and the electric motor 206 may be coupled by the high voltage circuit 214. The electric motor 206 may receive current from the power electronics unit 204 via the high voltage circuit 214. The high voltage circuit 214 may be rated to carry a high voltage such as, but not limited to as voltage as low as 100-volts of alternating current (VAC) to over 1,000 VAC. The high voltage may also be direct current, such as, but not limited to, as low as 48 volts direct current (VDC) to over 1,000 VDC. The high voltage to which the high voltage circuit 214 may be beneficial to provide adequate power to the electric motor 206.

The high voltage circuit 214 may include one or more busbars. For example, the high voltage circuit 214 may include three busbars, one each for carrying a respective phase of current (u, v, w) between the power electronics unit 204 and the electric motor 206.

The housing 202 may be made of a select material, such as, but not limited to, aluminum. The housing 202 may include a connector housing 216, a low voltage connector 218, and/or a motor housing 210. The motor housing 210 may house the electric motor 206. The connector housing 216 and/or the low voltage connector 218 may extend from the motor housing 210.

The connector housing 216 may house the high voltage circuit 214. The high voltage circuit 214 may be coupled and uncoupled between the power electronics unit 204 and the electric motor 206 through the connector housing 216 defined by the housing 202. The high voltage circuit 214 may be adapted for repeated physical engagement or disengagement for establishing and breaking the electrical connection between the power electronics unit 204 and the electric motor 206. The ability to couple and uncouple the high voltage circuit 214 from the power electronics unit 204 to the electric motor 206 through the connector housing 216 may enable servicing the power electronics unit 204 and/or the electric motor 206.

The access cover 100 may couple to the housing 202. The plate 102 of the access cover 100 may couple to the connector housing 216 of the housing 202. The access cover 100 may cover the high voltage circuit 214 when coupled to the connector housing 216. For example, the plate 102 of the access cover 100 may cover the high voltage circuit 214 when coupled to the connector housing 216. Covering the high voltage circuit 214 via the access cover 100 may prevent access to the high voltage circuit 214 via the connector housing 216. Thus, the access cover 100 may control access to the high voltage circuit 214 between the power electronics unit 204 and the electric motor 206.

In embodiments, the plate 102 may couple to the connector housing 216 by the fasteners 212. The fasteners 212 may couple the plate 102 to the connector housing 216 through the through holes 110. The fasteners 212 may include, but are not limited to, bolts. The fasteners 212 may include a matching cross-section as the through holes 110. The through holes 110 defined by the plate 102 may receive the fasteners 212. The through holes 110 may include a sufficient size (e.g., diameter where the holes have a circular cross-section) to receive the fasteners 212. In embodiments, the through holes 110 may include a sufficient size to receive the fasteners 212 with a clearance fit. The fasteners 212 may insert from the top surface 103 of the plate 102 through the through holes 110 defined by the plate 102 of the access cover 100 up to the connector housing 216. The connector housing 216 may define one or more threaded holes to which the fasteners 212 may couple.

The housing 202 may include the low voltage connector 218. The low voltage connector 218 may be disposed adjacent to the connector housing 216. The low voltage connector 218 may be configured to generate one or more signals, such as, but not limited to, an interlock signal, a temperature signal, a position signal, or the like. The low voltage connector 218 may include, but is not limited to, an interlock sensor, a temperature sensor, and/or a position sensor, which may generate the interlock signal, temperature signal, and position signal, respectively.

The low voltage plug 208 may couple to the low voltage connector 218. For example, the low voltage plug 208 may couple to the low voltage connector 218 via a plug-and-socket type connection.

The access cover 100 may couple between the low voltage plug 208 and the low voltage connector 218. The receiver 108 of the access cover 100 may couple between the low voltage plug 208 and the low voltage connector 218. For example, the through slot 112 of the receiver 108 may receive the low voltage plug 208 by which the receiver 108 may couple between the low voltage plug 208 and the low voltage connector 218.

Coupling the receiver 108 between the low voltage plug 208 and the low voltage connector 218 may thereby preventing uncoupling of the plate 102 from the connector housing 216. For example, coupling the receiver 108 between the low voltage plug 208 and the low voltage connector 218 may prevent movement of the plate 102 relative to the connector housing 216. Thus, the access cover 100 may prevent access to the high voltage circuit 214 via the connector housing 216 while the low voltage plug 208 is coupled to the low voltage connector 218. Preventing access via the connector housing 216 while the low voltage plug 208 is coupled to the low voltage connector 218 may reduce a risk of shock associated with the high voltage circuit 214. Coupling the receiver 108 between the low voltage plug 208 and the low voltage connector 218 may require the low voltage plug 208 to be uncoupled from the low voltage connector 218 prior to uncoupling the plate 102 from the connector housing 216.

In embodiments, the fasteners 212 may be configured to uncouple from the plate 102 and the connector housing 216. The fasteners 212 may be configured to uncouple from the plate 102 and the connector housing 216 while the low voltage plug 208 is coupled to the low voltage connector 218 and/or after the low voltage plug 208 is uncoupled from the low voltage connector 218. The access cover 100 may be prevented from uncoupling from the housing 202 while the low voltage plug 208 is coupled to the power electronics unit 204 regardless of whether the fasteners 212 are coupled to or uncoupled from the plate 102 and the connector housing 216. The geometry of the access cover 100 may prevent the uncoupling of the plate 102 from the connector housing 216 while the low voltage plug 208 is coupled to the power electronics unit 204 even if the fasteners 212 are removed. However, the fasteners 212 may be beneficial to reduce vibration of the access cover 100 (e.g., vibration due motion) and/or to provide a watertight seal between the plate 102 and the connector housing 216. For example, the fasteners 212 may act as clamps to provide a watertight fitment.

The low voltage plug 208 may be configured to uncouple from the low voltage connector 218 thereby permitting the plate 102 to uncouple from the connector housing 216. The plate 102 may uncouple from the connector housing 216 when the low voltage plug 208 is uncoupled from the low voltage connector 218. The access cover 100 may be configured to translate when the low voltage plug 208 is uncoupled from the low voltage connector 218. The translation of the access cover 100 may uncouple the plate 102 from the connector housing 216. The connector housing 216 may be uncovered and may provide access to the high voltage circuit 214 when the plate 102 is uncoupled from the connector housing 216. The connector housing 216 may enable access to the high voltage circuit 214 when the low voltage plug 208 is uncoupled from the low voltage connector 218 and the plate 102 is uncoupled from the connector housing 216.

The power electronics unit 204 may include an interlock circuit 220. The interlock circuit 220 may be a high voltage interlock (HVIL). The interlock circuit 220 may include, but is not limited to, one or more switches or the like. The interlock circuit 220 may be a high voltage interlock for the high voltage circuit 214. Signals from the low voltage plug 208 may be used by the interlock circuit 220. The low voltage plug 208 may couple the low voltage connector 218 to the interlock circuit 220 of the power electronics unit 204. The interlock circuit 220 may receive the one or more signals from the low voltage connector 218 via the low voltage plug 208.

The power electronics unit 204 may receive the signals when the low voltage plug 208 is coupled to the low voltage connector 218. The interlock circuit 220 may allow the power electronics unit 204 to supply power to the high voltage circuit 214 when the low voltage plug 208 is coupled to the low voltage connector 218 and the power electronics unit 204 receives the signals. The signals received may indicate that the low voltage plug 208 is coupled to the low voltage connector 218, such that the plate 102 remains coupled to the connector housing 216 and power may be supplied to the high voltage circuit 214 without a risk of shock.

The power electronics unit 204 may not receive the signals when the low voltage plug 208 is uncoupled from the low voltage connector 218. The interlock circuit 220 may detect the low voltage plug 208 is uncoupled from the low voltage connector 218 when no longer receiving the signals. The interlock circuit 220 may prevent the power electronics unit 204 from supplying power to the high voltage circuit 214 when the low voltage plug 208 is uncoupled from the low voltage connector 218 and the power electronics unit 204 does not receive the signals. The signals may be used as feedback to cut the high voltage power to the high voltage circuit 214. Failing to receive the signals may indicate that the low voltage plug 208 is uncoupled from the low voltage connector 218, such that the plate 102 is able to be coupled to the connector housing 216 and power should not be supplied to the high voltage circuit 214. The interlock circuit 220 may shut off power to the high voltage circuit 214 when the low voltage plug 208 is uncoupled from the low voltage connector 218. Thus, the interlock circuit 220 may shut down power to the high voltage circuit 214 when access to the high voltage circuit 214 may be gained via the connector housing 216.

The access cover 100 with the receiver 108 may provide for covering the high voltage circuit 214 when power is supplied and preventing uncovering the high voltage circuit 214 until the low voltage plug 208 is uncoupled from the low voltage connector 218.

Figure 2A:
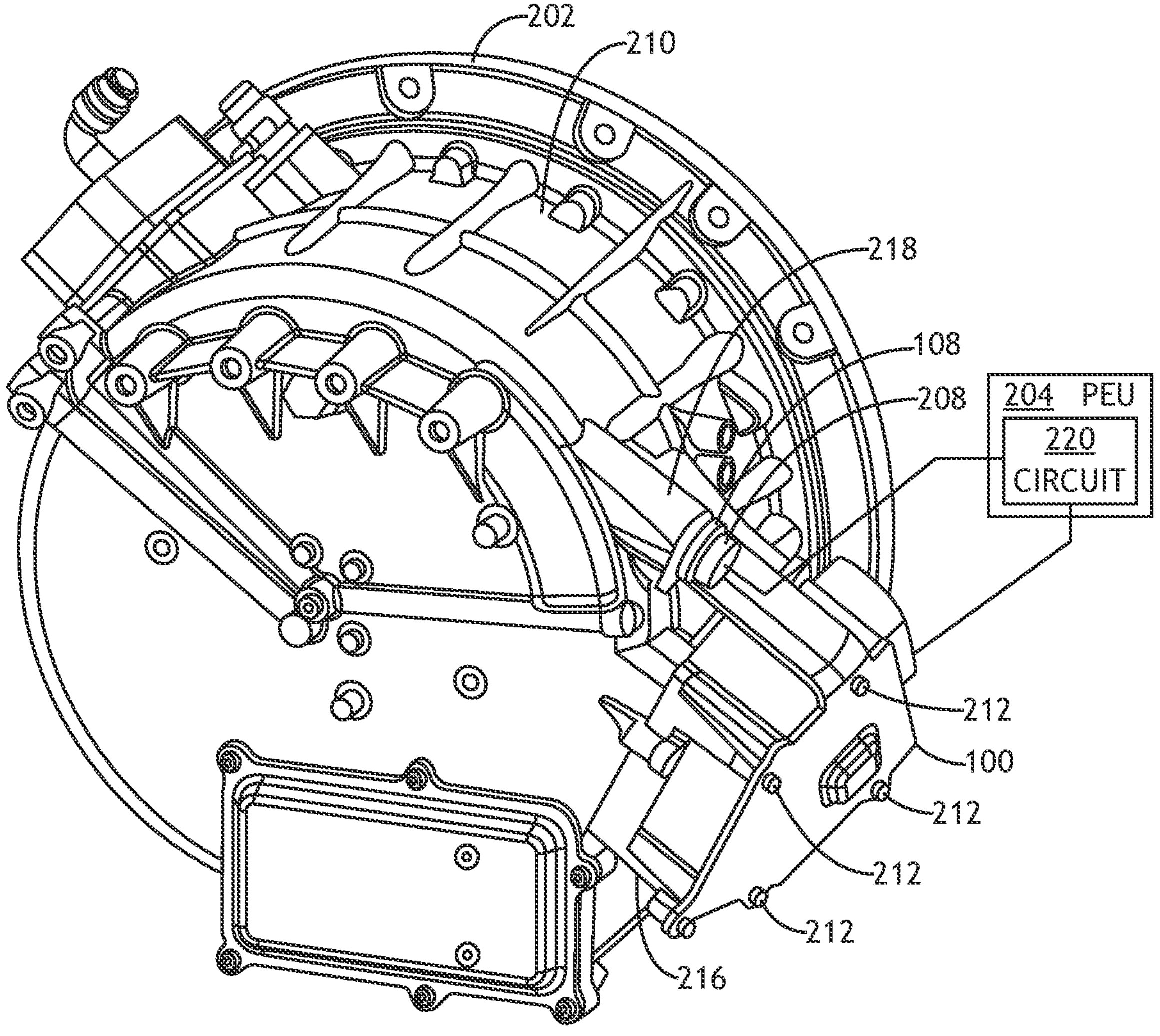
FIG. 2A illustrates a perspective view of a high voltage system with the access cover covering a high voltage circuit and a power electronics unit supplying power to the high voltage circuit while an interlock circuit receives signals from a low voltage connector via a low voltage plug, in accordance with one or more embodiments of the present disclosure.
Figure 2B:
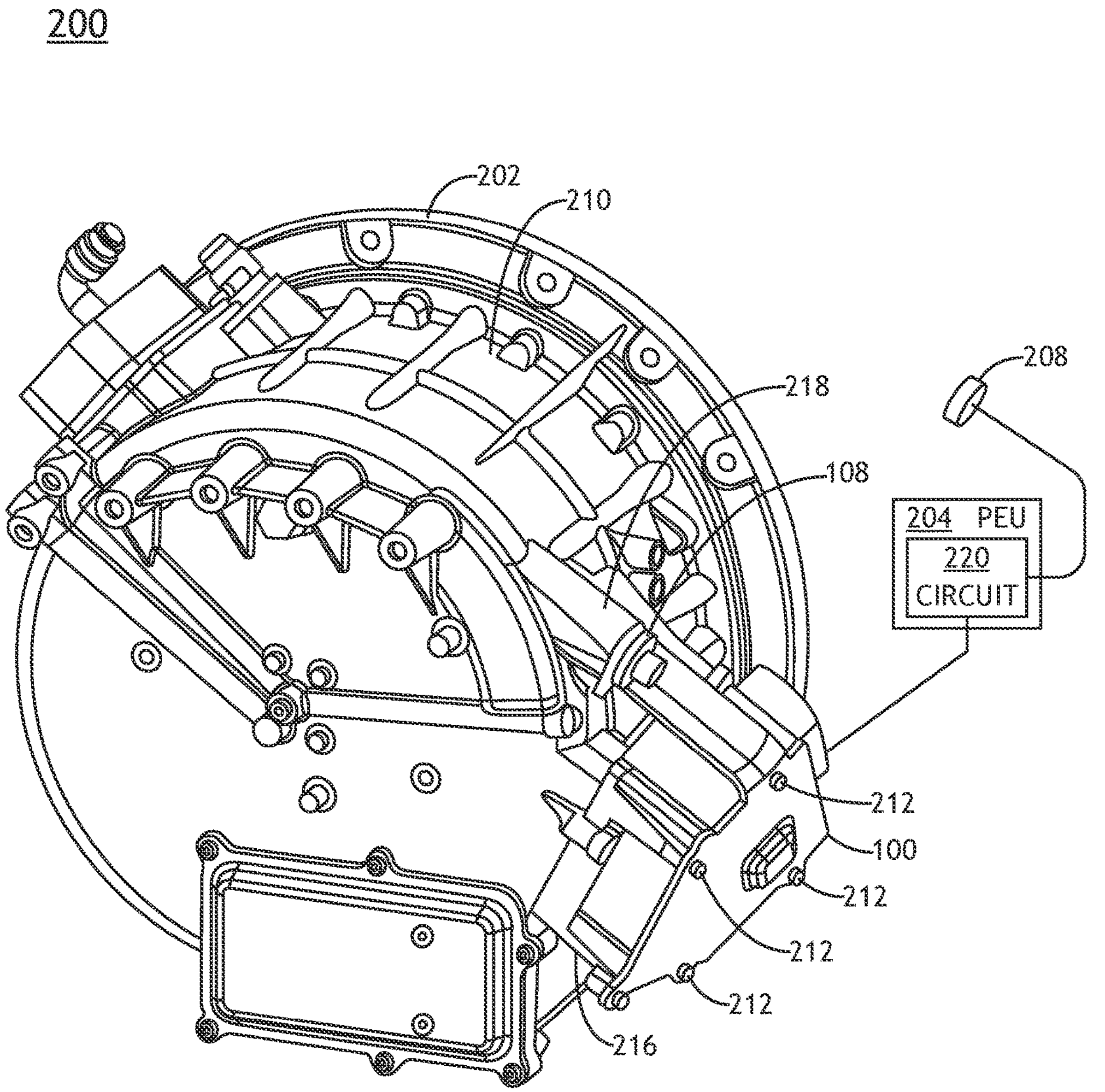
FIG. 2B illustrates a perspective view of the high voltage system after uncoupling the low voltage plug from the low voltage connector, in accordance with one or more embodiments of the present disclosure.
Figure 2C:
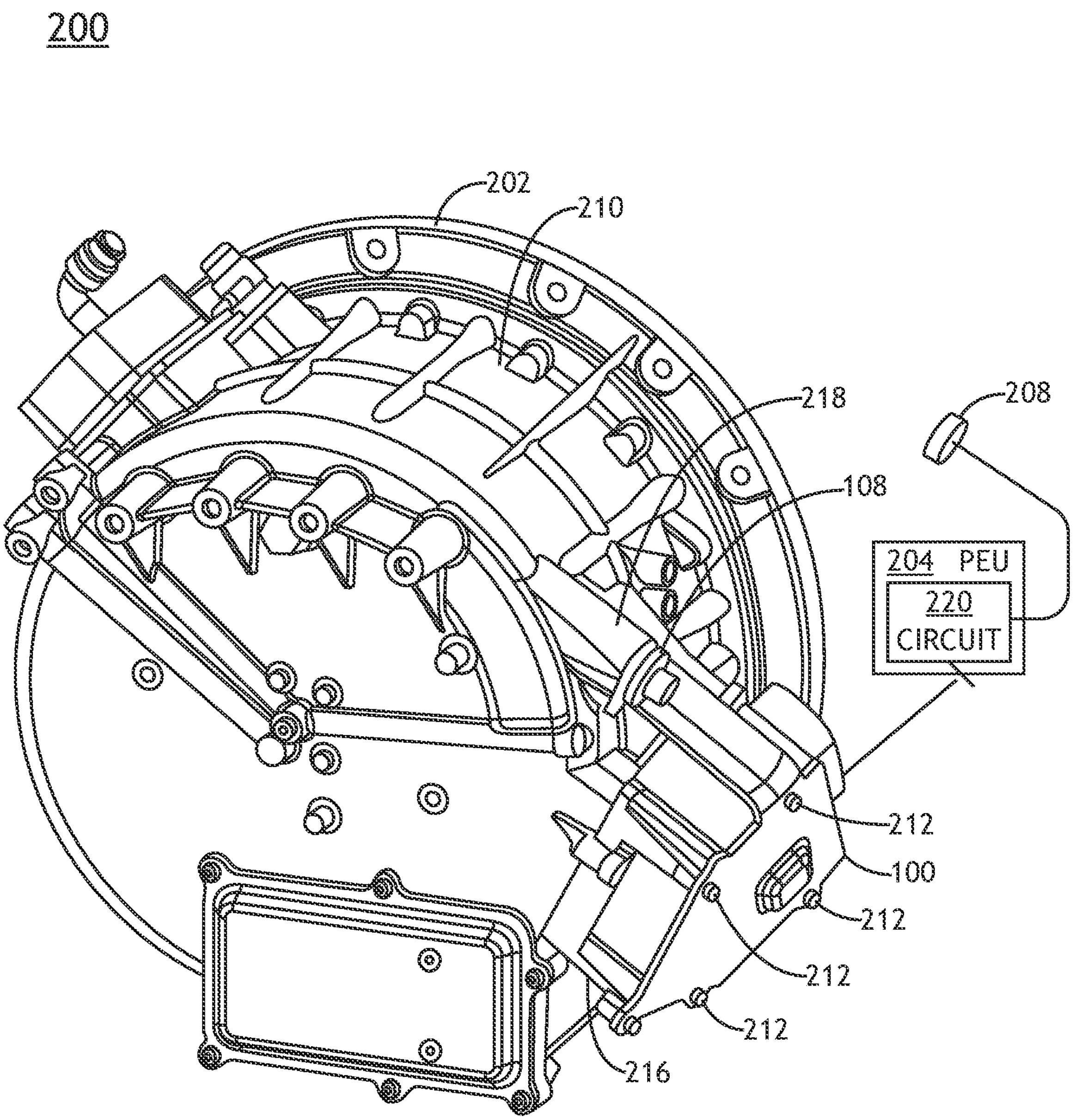
FIG. 2C illustrates a perspective view of the high voltage system after uncoupling the low voltage plug from the low voltage connector and preventing power from being supplied to the high voltage circuit by switching off the power to the high voltage circuit, in accordance with one or more embodiments of the present disclosure.
Figure 2D:
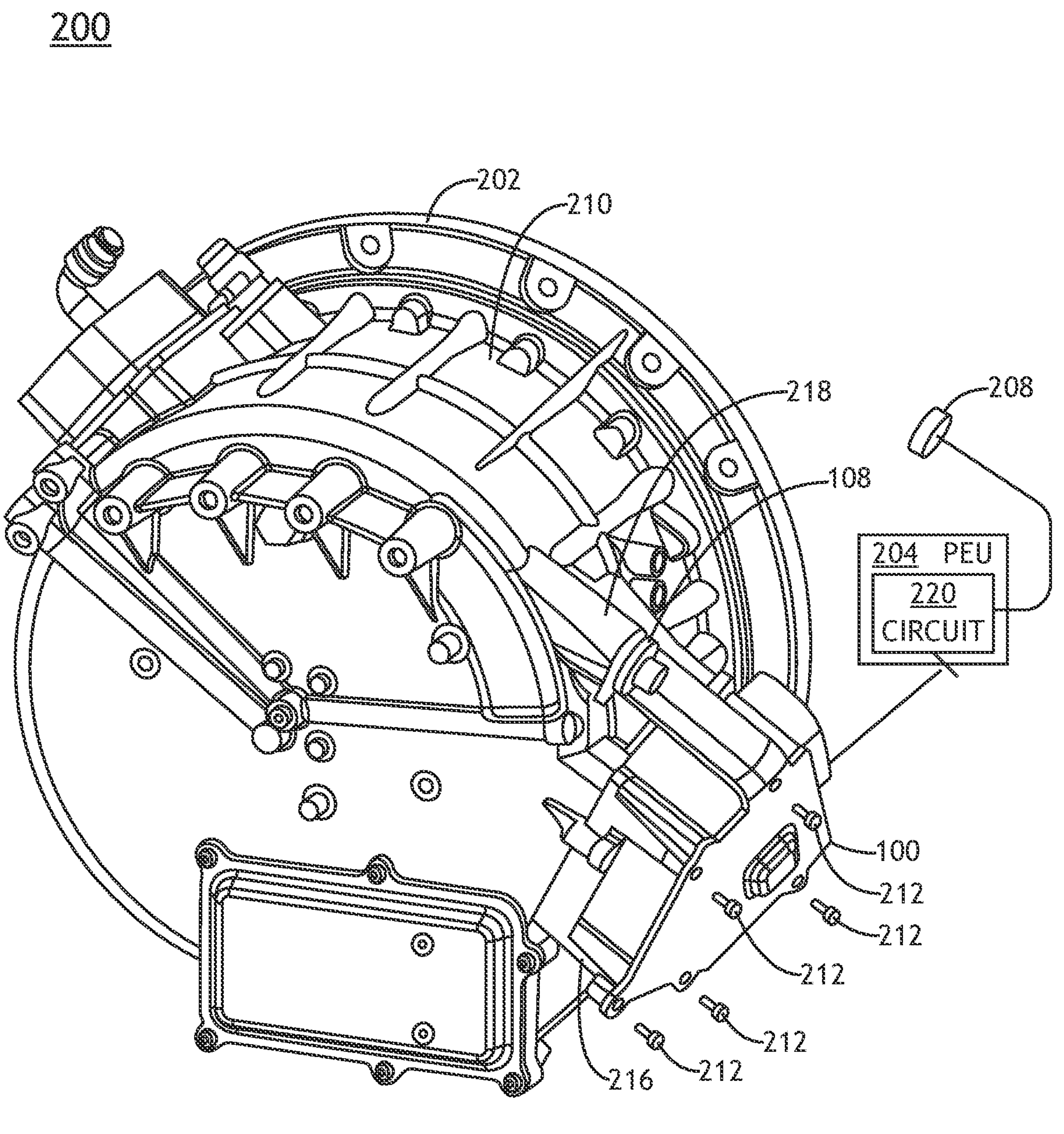
FIG. 2D illustrates a perspective view of the high voltage system after uncoupling fasteners from the plate of the access cover and the connector housing, in accordance with one or more embodiments of the present disclosure.
Figure 2E:
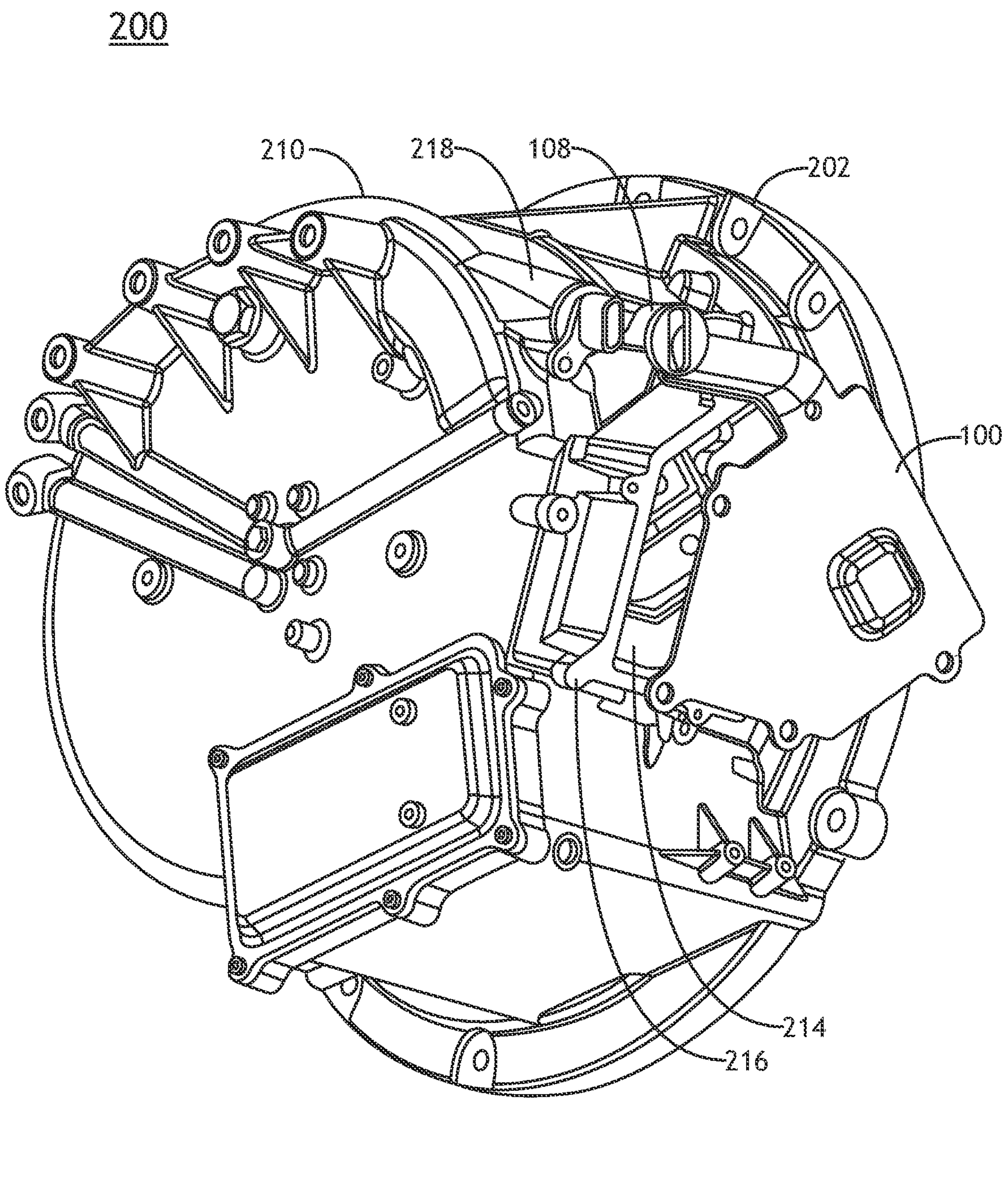
FIG. 2E illustrates a perspective view of the high voltage system after uncoupling the plate from the connector housing to uncover the high voltage circuit, in accordance with one or more embodiments of the present disclosure.
Figure 2F:
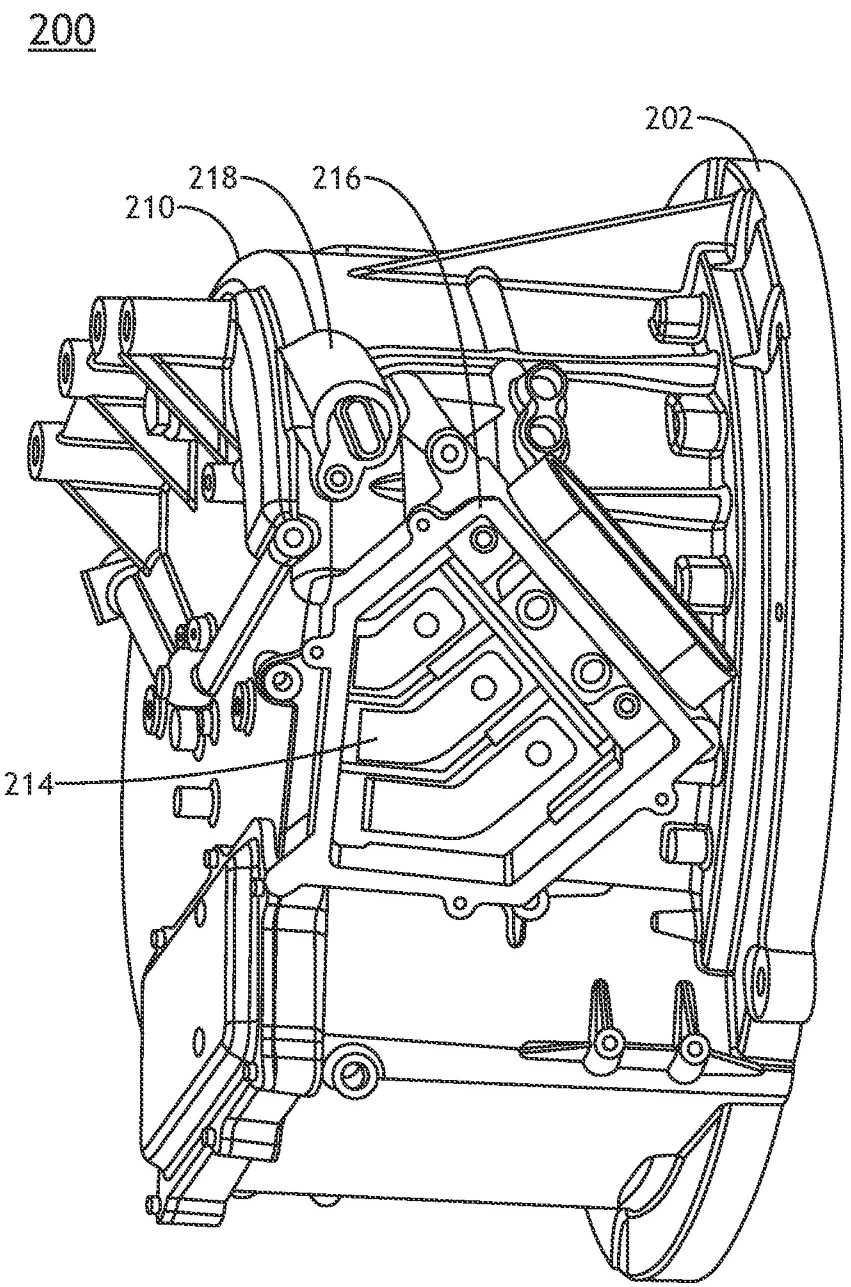
FIG. 2F illustrates a side view of the high voltage system after uncoupling the plate from the connector housing to uncover the high voltage circuit, in accordance with one or more embodiments of the present disclosure.
Figure 2G:
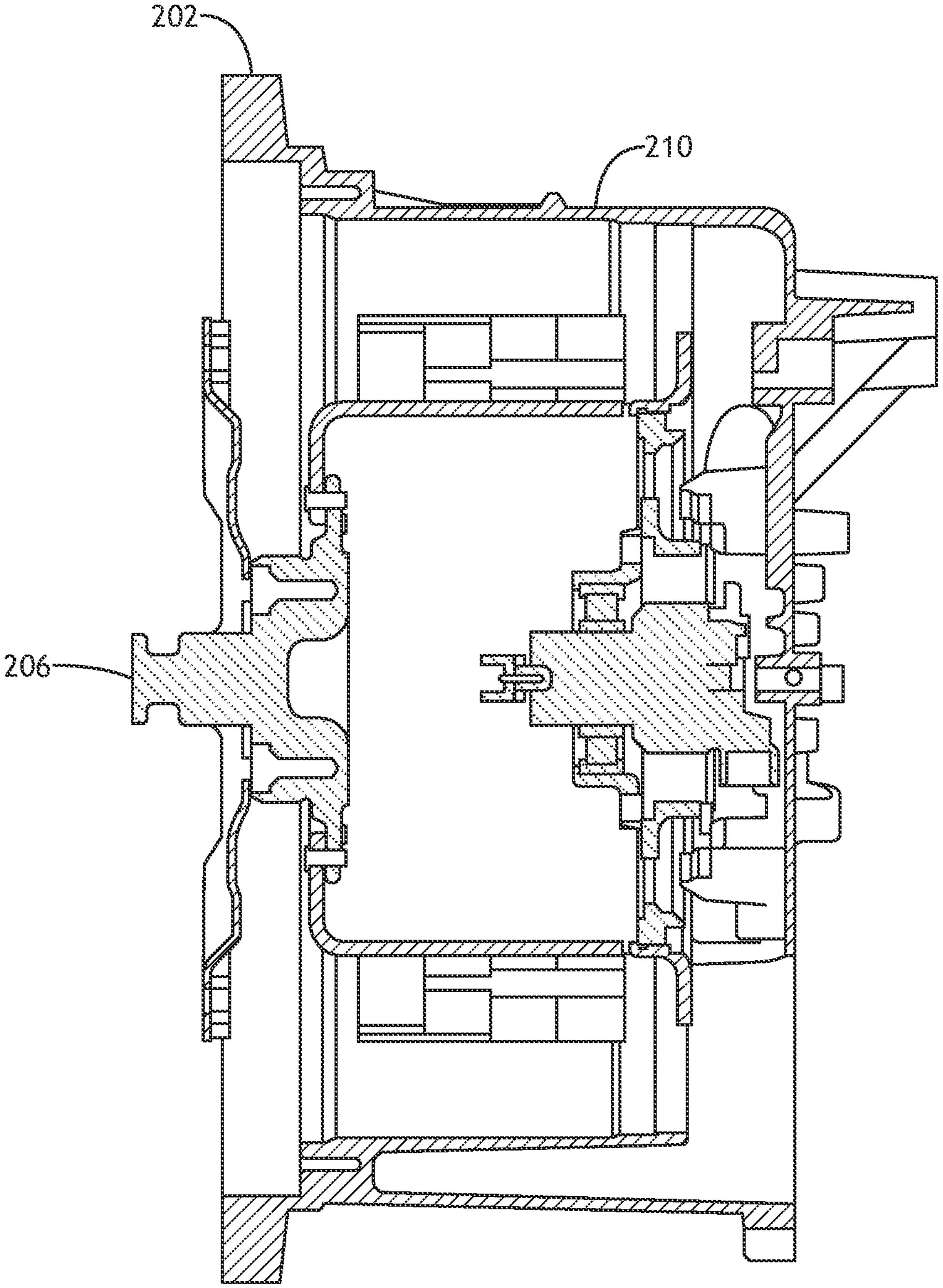
FIG. 2G illustrates a cross-section view of the high voltage system with an electric motor, in accordance with one or more embodiments of the present disclosure.
Figure 3:
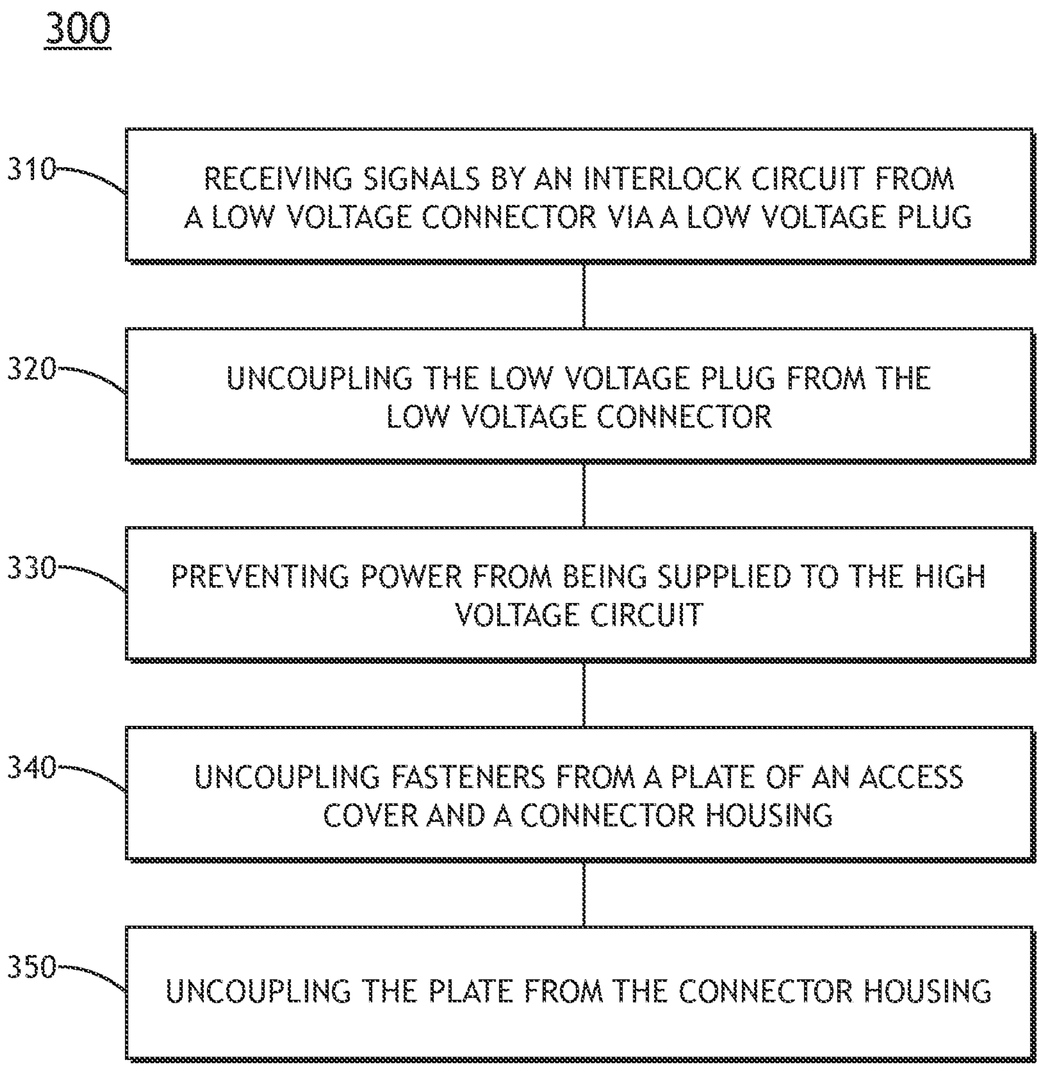
FIG. 3 illustrates a flow diagram of a method, in accordance with one or more embodiments of the present disclosure.

FIG. 3 illustrates a flow diagram of a method 300, in accordance with one or more embodiments of the present disclosure. The method 300 provides a means for removing power to the high voltage circuit 214 before uncovering the high voltage circuit 214. The embodiments and the enabling technology described previously herein in the context of the access cover 100 and the high voltage system 200 should be interpreted to extend to the method 300. It is further recognized, however, that the method is not limited to the access cover 100 and the high voltage system 200. The method 300 may be further understood with reference to FIGS. 2A-2F.

In a step 310, an interlock circuit may receive signals from a low voltage connector via a low voltage plug. For example, the interlock circuit 220 may receive signals from the low voltage connector 218 via the low voltage plug 208. The interlock circuit 220 may allow the power electronics unit 204 to supply power to the high voltage circuit 214 while the interlock circuit 220 receives signals. FIG. 2A illustrates a perspective view of the high voltage system 200 with the access cover 100 covering the high voltage circuit 214 and the power electronics unit 204 supplying power to the high voltage circuit 214 while the interlock circuit 220 receives signals from the low voltage connector 218 via the low voltage plug 208.

In a step 320, the low voltage plug may be uncoupled from a low voltage connector. For example, the low voltage plug 208 may be uncoupled from the low voltage connector 218. The interlock circuit 220 may not receive the signals when the low voltage plug 208 is uncoupled from the low voltage connector 218. FIG. 2B illustrates a perspective view of the high voltage system 200 after uncoupling the low voltage plug 208 from the low voltage connector 218.

In a step 330, the interlock circuit 220 may prevent power from being supplied to the high voltage circuit 214. The interlock circuit 220 may prevent the power electronics unit 204 from supplying the power to the high voltage circuit 214. The interlock circuit 220 may prevent the power electronics unit 204 from supplying power to the high voltage circuit 214 in response to uncoupling the low voltage plug 208 from the low voltage connector 218. The interlock circuit 220 may detect the low voltage plug 208 has been uncoupled from the low voltage connector 218 by failing to receive the signals from the low voltage connector 218 via the low voltage plug 208. FIG. 2C illustrates a perspective view of the high voltage system 200 after preventing power from being supplied to the high voltage circuit 214 by switching off the power to the high voltage circuit 214.

In a step 340, fasteners may be uncoupled from a plate of an access cover and a connector housing. For example, the fasteners 212 may be uncoupled from the plate 102 of the access cover 100 and the connector housing 216. The fasteners 212 may be uncoupled from the plate 102 by removing the fasteners 212 from the through holes 110 defined by the plate 102. FIG. 2D illustrates a perspective view of the high voltage system 200 after uncoupling the fasteners 212 from the plate 102 of the access cover 100 and the connector housing 216.

It is contemplated that the fasteners 212 may be uncoupled from the plate 102 and the connector housing 216 before or after the low voltage plug 208 is uncoupled from the low voltage connector 218 and/or before or after the interlock circuit 220 may prevent power from being supplied to the high voltage circuit 214. In this example, the step 340 may be performed before or after the step 320 and/or before or after the step 330.

In a step 350, the plate of the access cover may be uncoupled from the connector housing. For example, the plate 102 of the access cover 100 may be uncoupled from the connector housing 216. The plate 102 may be uncoupled from the connector housing 216 to uncover the high voltage circuit 214. FIGS. 2E-2F illustrate a perspective view and a side view, respectively, after uncoupling the plate 102 from the connector housing 216 to uncover the high voltage circuit 214. The plate 102 may be uncoupled from the connector housing 216 in response to uncoupling the low voltage plug 208 from the low voltage connector 218, in response to preventing power from being supplied to the high voltage circuit 214, and/or in response to uncoupling the fasteners 212 from the plate 102 and the connector housing 216. In this example, step 350 may be performed only after both the step 320, the step 330, and/or the step 340.

Figure 4A:
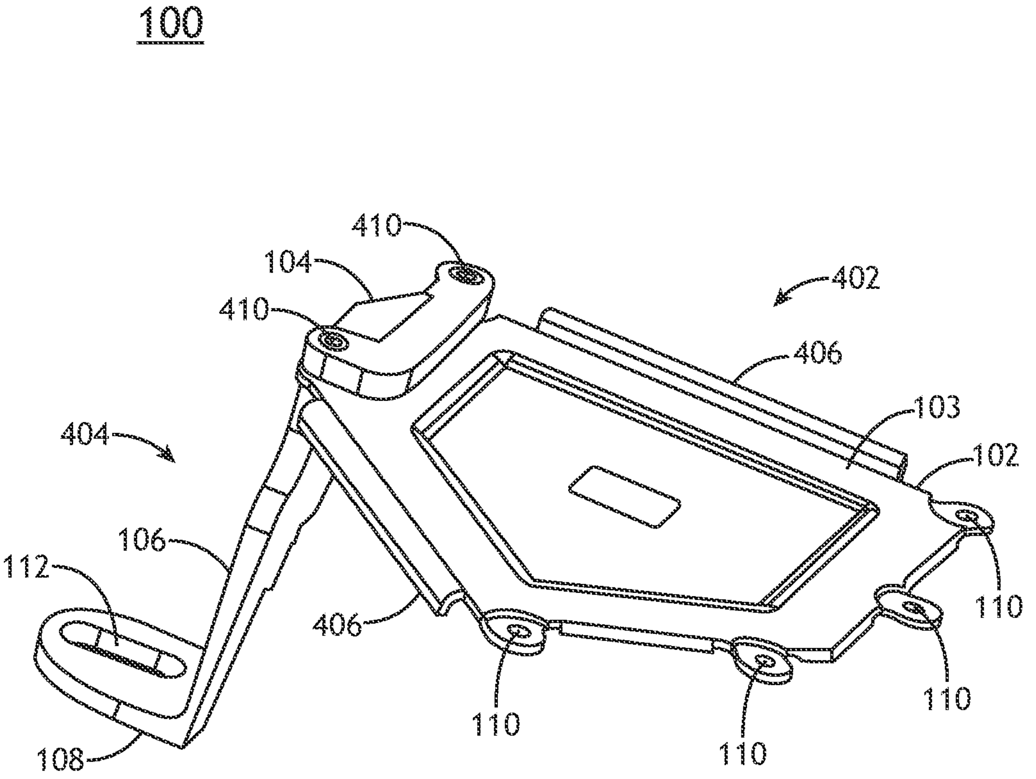
FIG. 4A illustrates a perspective view of an access cover with a first member and a second member which are coupled, in accordance with one or more embodiments of the present disclosure.
Figure 4B:
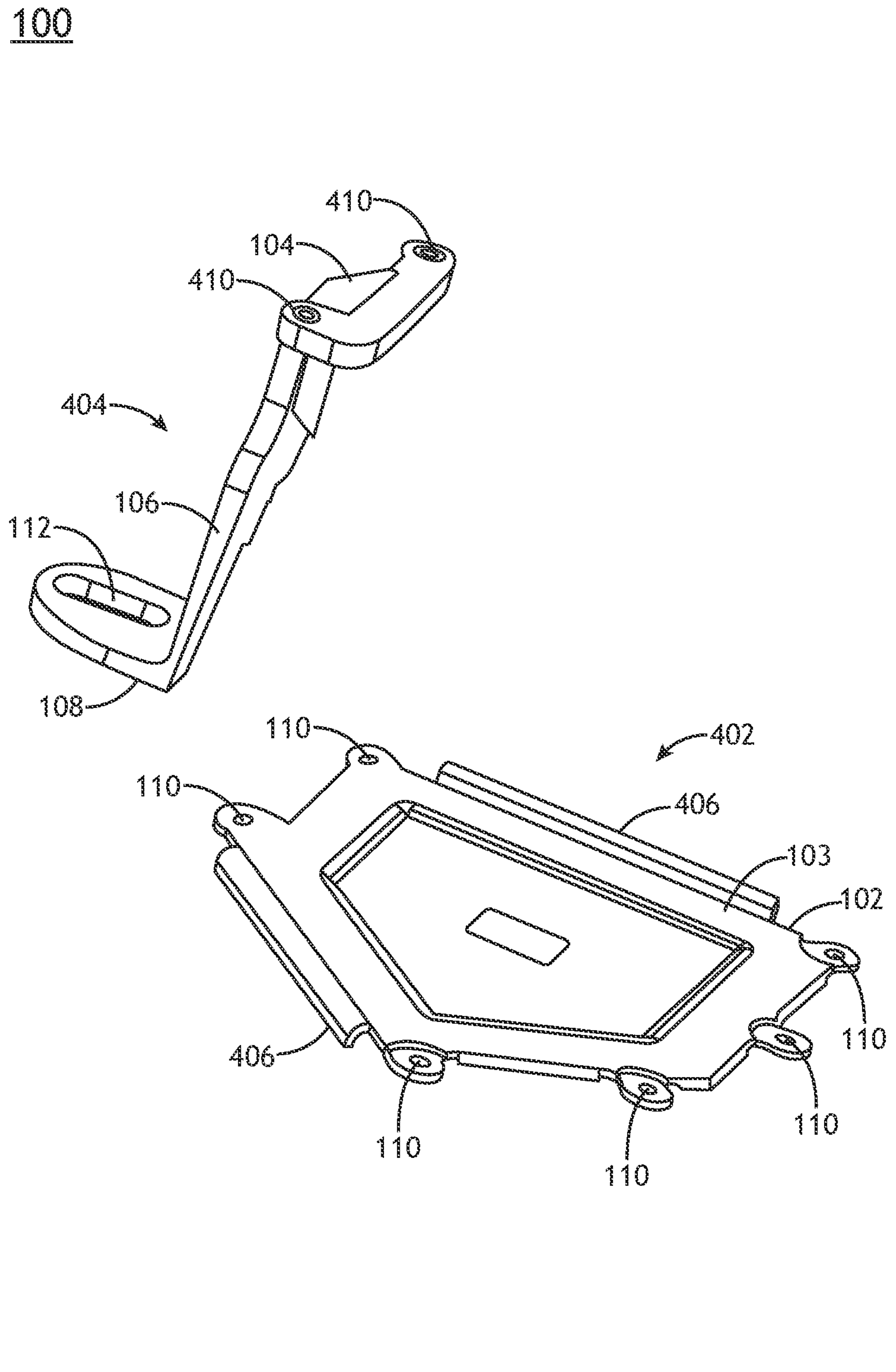
FIG. 4B illustrates a perspective view of the access cover with the first member and the second member which are uncoupled, in accordance with one or more embodiments of the present disclosure.
Figure 4C:
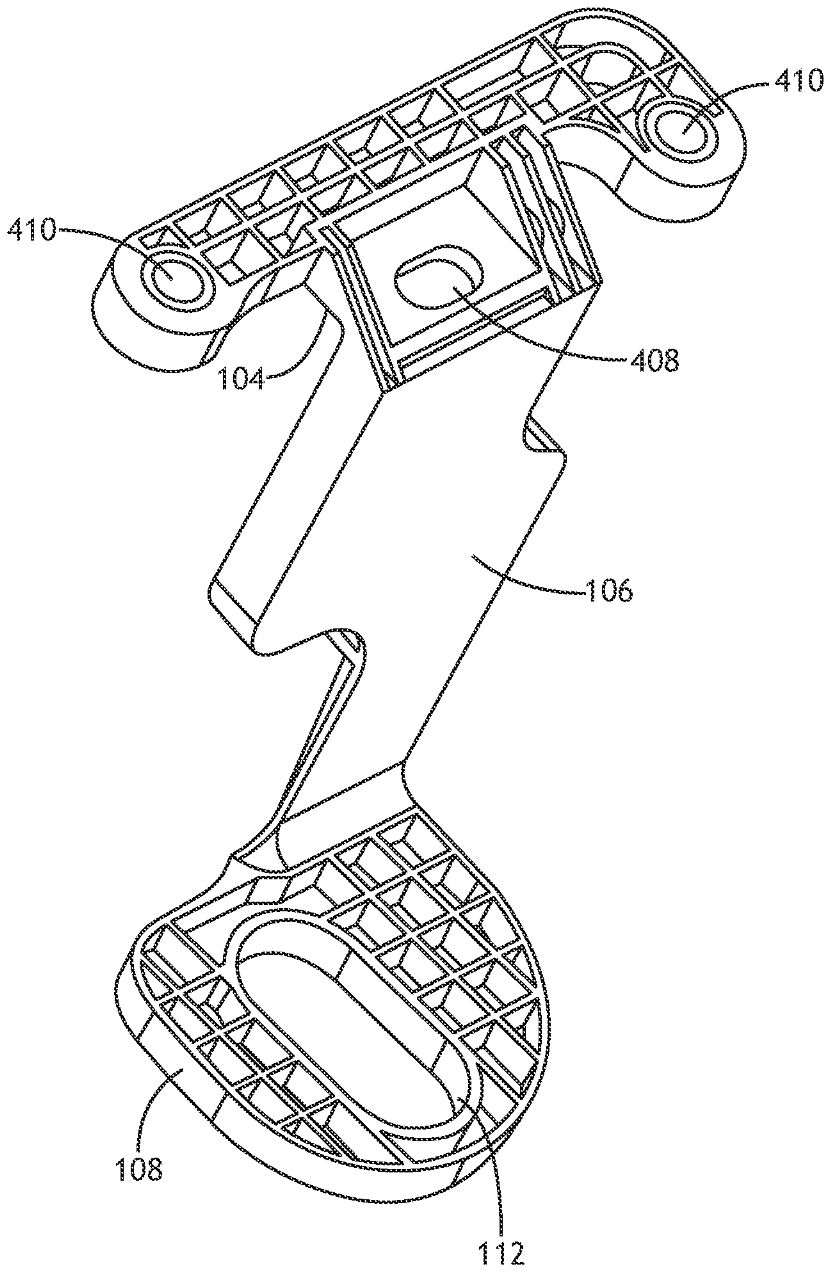
FIG. 4C illustrates a perspective view of the second member of the access cover, in accordance with one or more embodiments of the present disclosure.
Figure 5A:
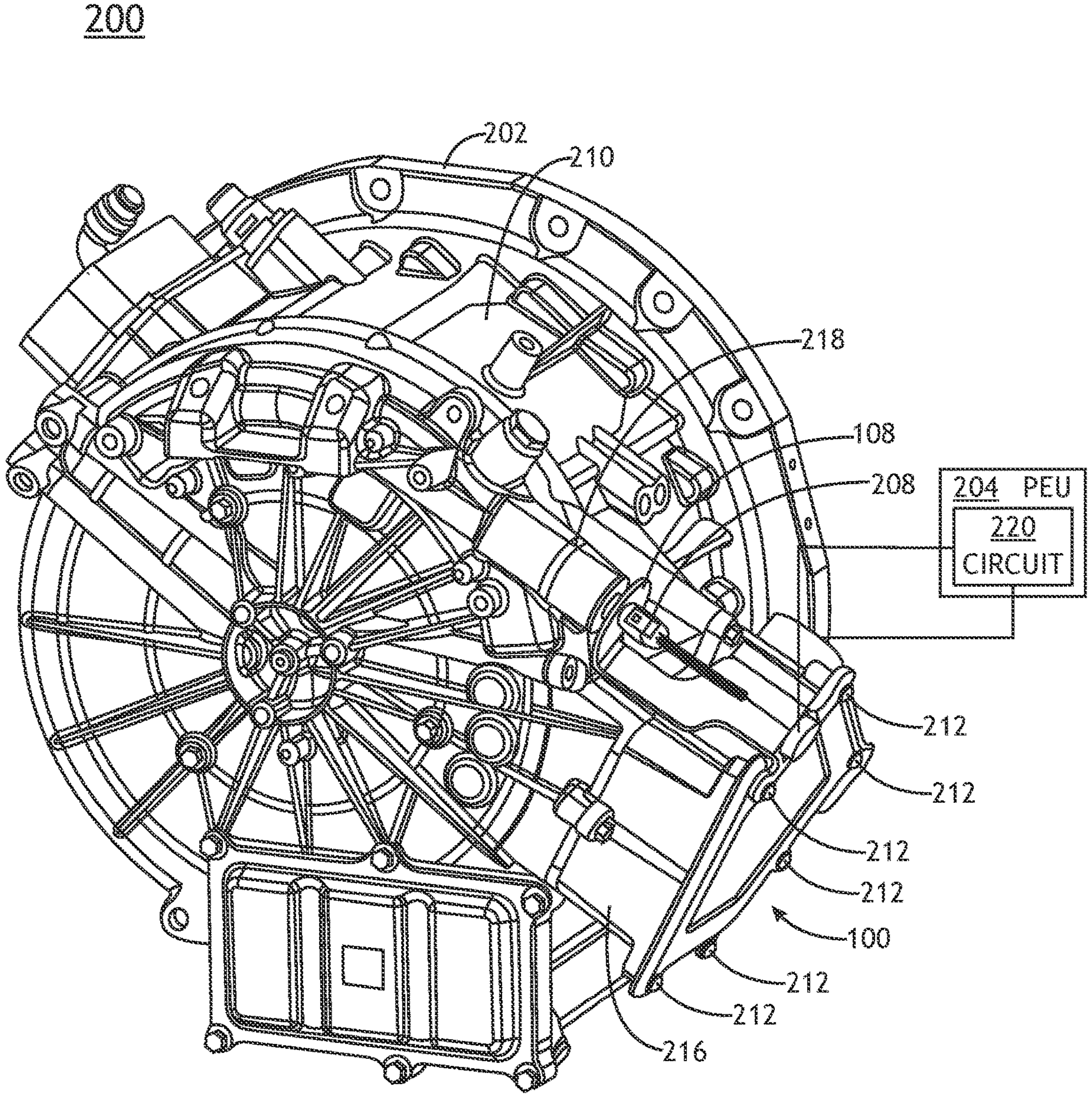
FIG. 5A illustrates a perspective view of a high voltage system with the access cover covering a high voltage circuit and a power electronics unit supplying power to the high voltage circuit while an interlock circuit receives signals from a low voltage connector via a low voltage plug, in accordance with one or more embodiments of the present disclosure.
Figure 5B:
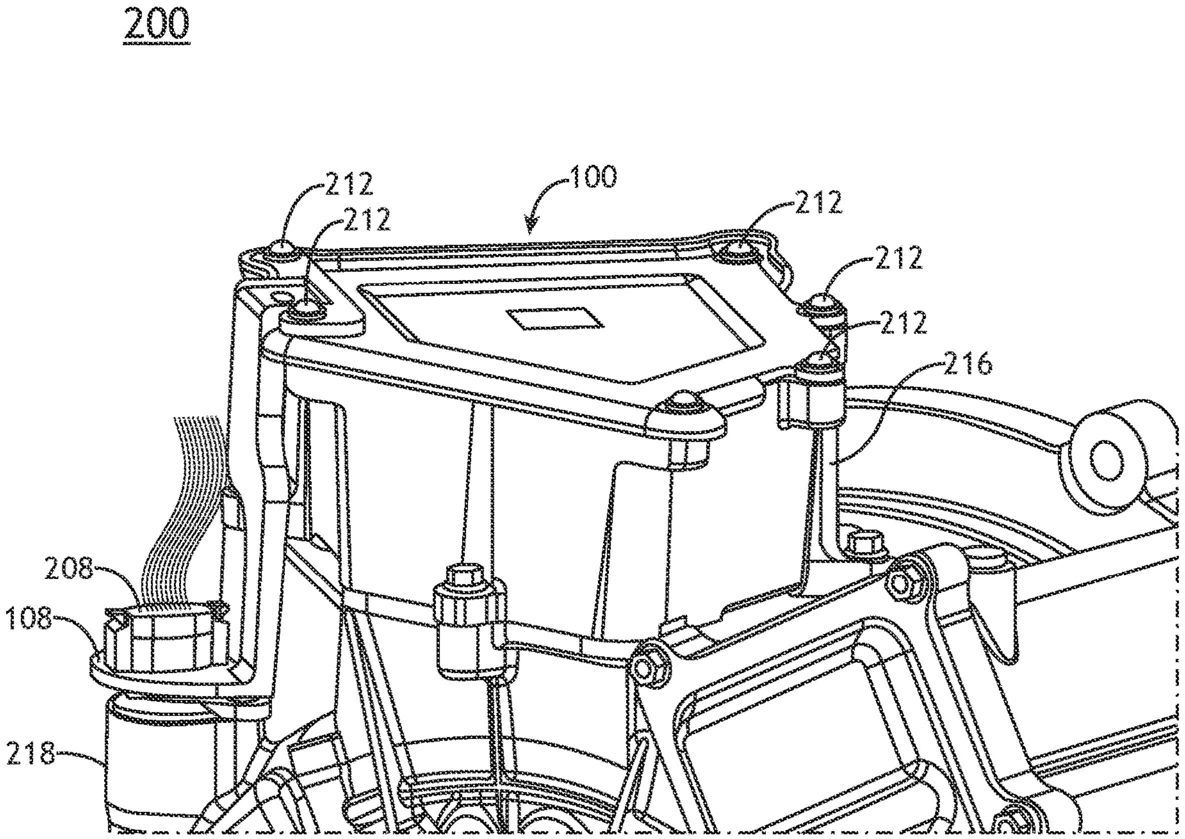
FIG. 5B illustrates a partial perspective view of the high voltage system with the access cover covering the high voltage circuit, in accordance with one or more embodiments of the present disclosure.
Figure 5C:
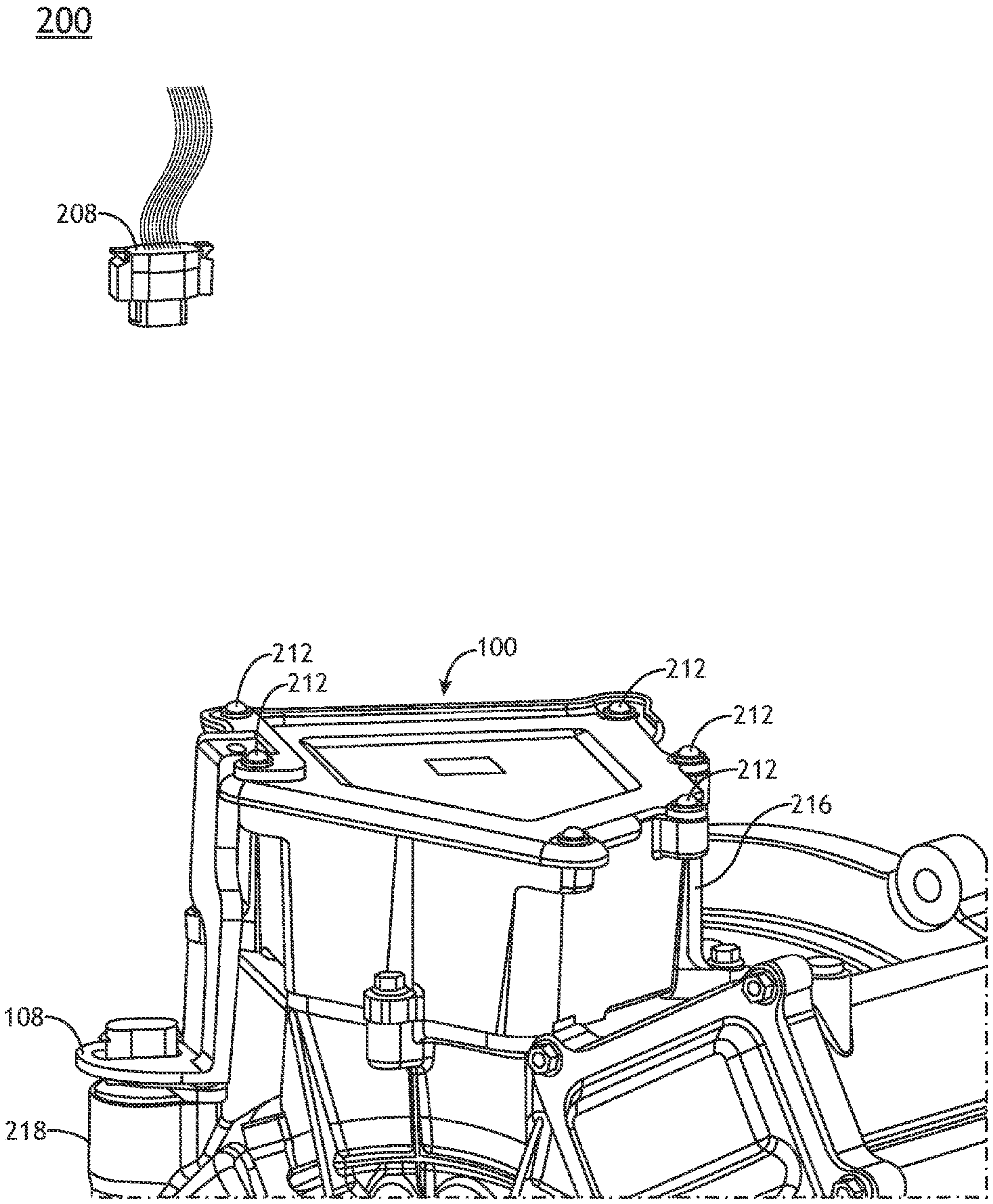
FIG. 5C illustrates a partial perspective view of the high voltage system after uncoupling the low voltage plug from the low voltage connector, in accordance with one or more embodiments of the present disclosure.
Figure 5D:
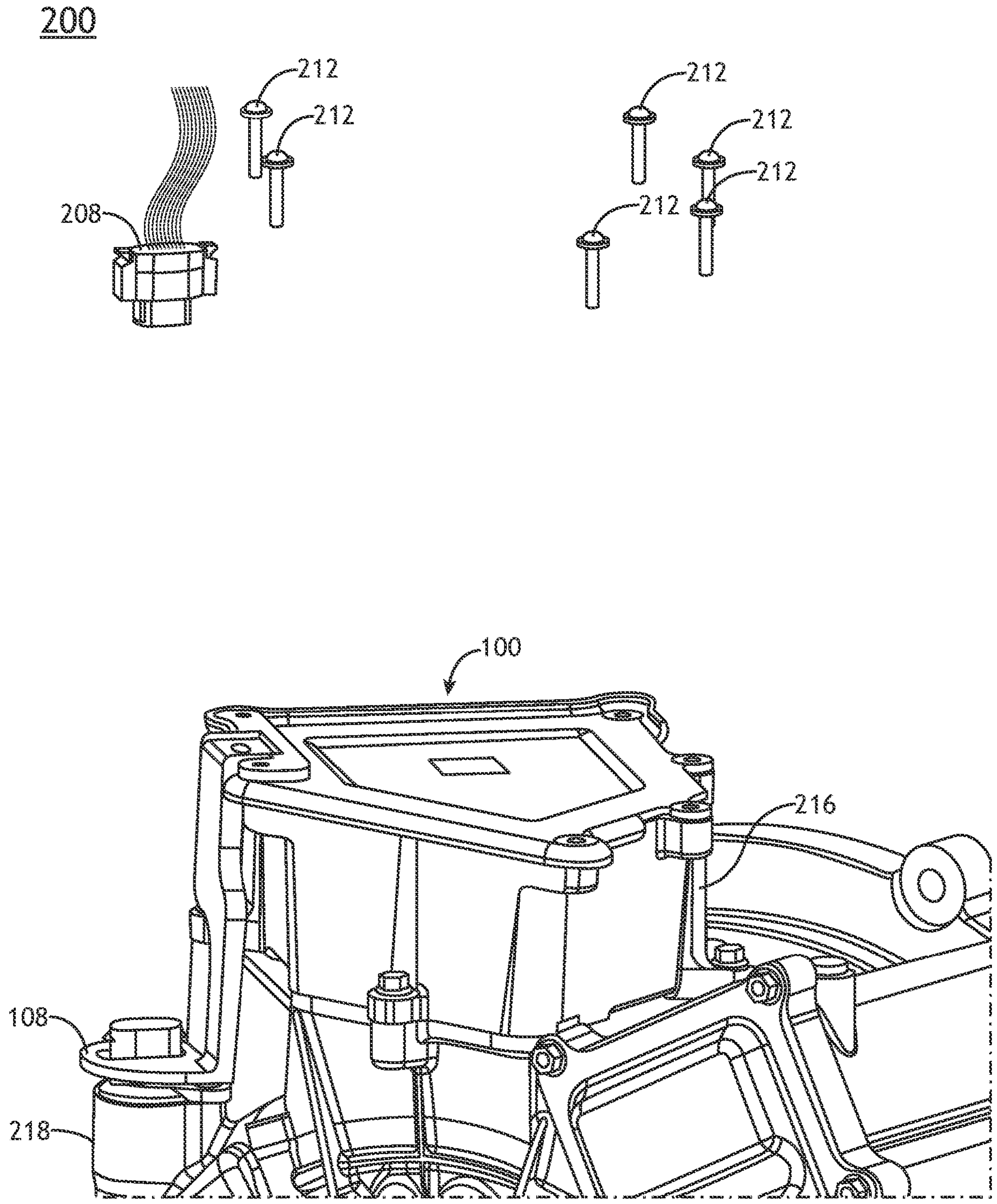
FIG. 5D illustrates a partial perspective view of the high voltage system after uncoupling fasteners from the plate of the access cover and the connector housing, in accordance with one or more embodiments of the present disclosure.
Figure 5E:
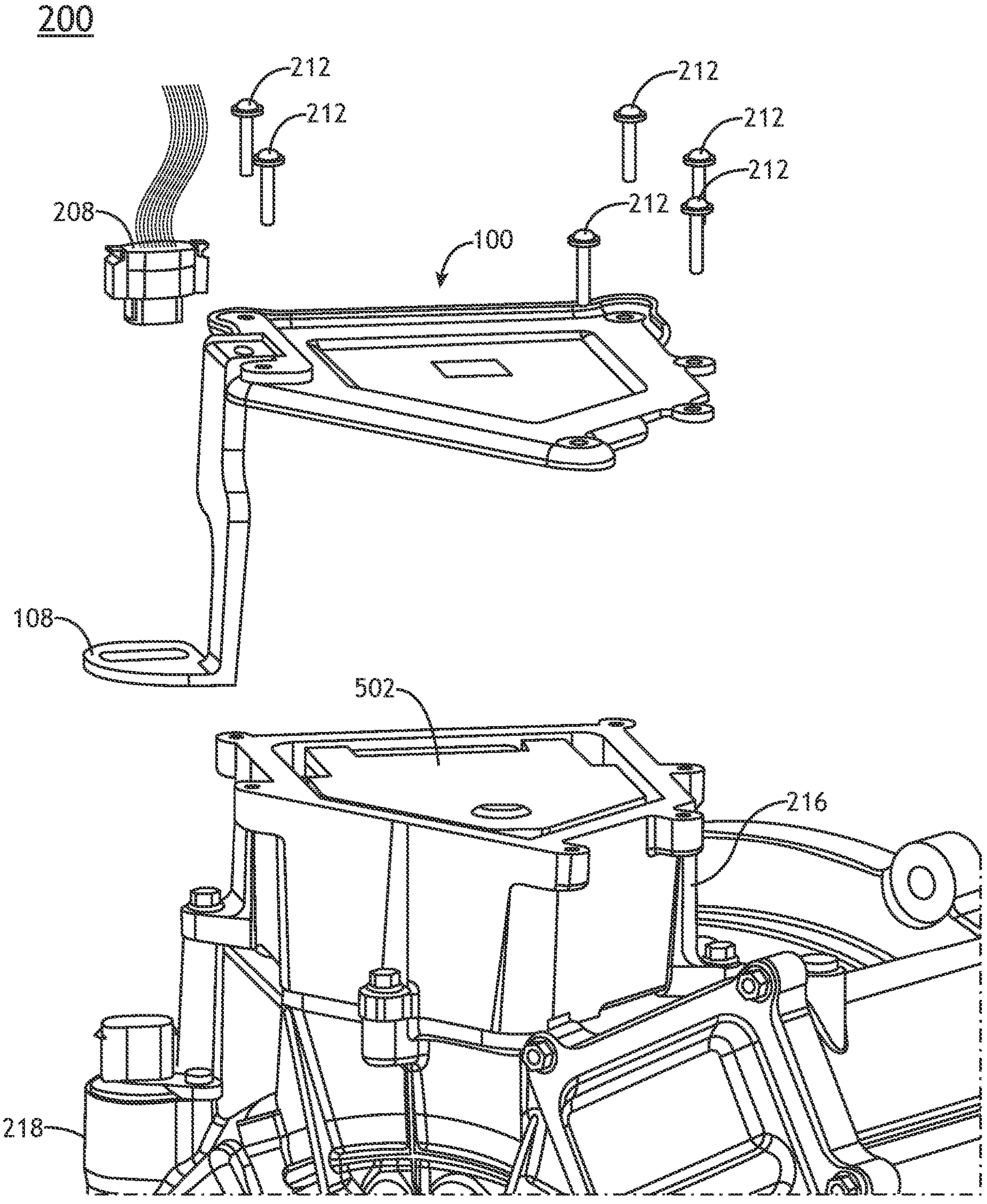
FIG. 5E illustrates a partial perspective view of the high voltage system after uncoupling the plate from the connector housing, in accordance with one or more embodiments of the present disclosure.
Figure 5F:
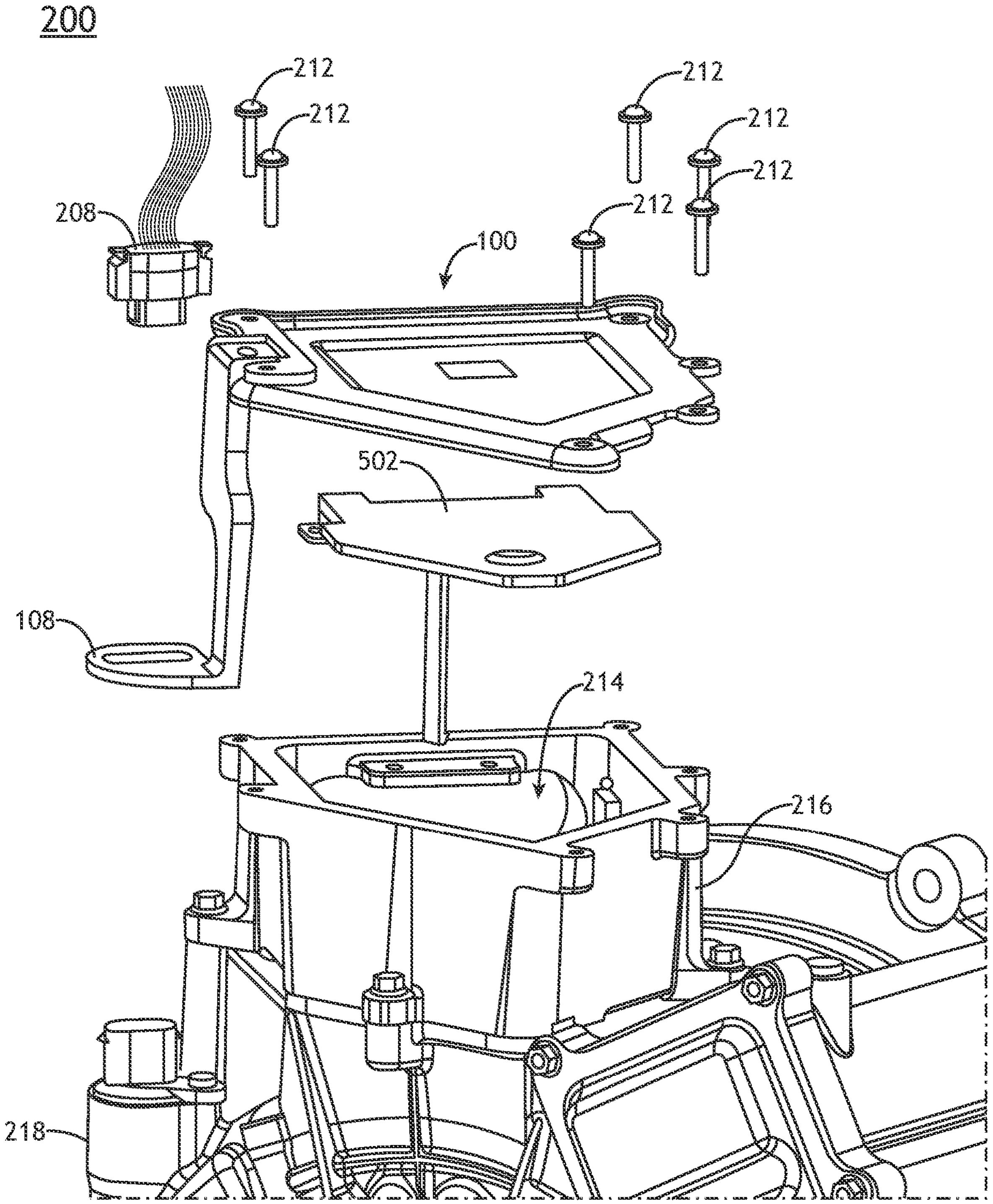
FIG. 5F illustrates a partial perspective view of the high voltage system after uncoupling a delay plate from the connector housing to uncover the high voltage circuit, in accordance with one or more embodiments of the present disclosure.

FIGS. 4A-4C illustrate an access cover 400 of a high voltage system for use in an electric vehicle, in accordance with one or more embodiments of the present disclosure. The discussion of the access cover 100 is incorporated herein by reference in the entirety as to the access cover 400. The access cover 400 may include the plate 102, the L-bend 104, the vertical leg 106, and/or the receiver 108. The access cover 400 may also include a first member 402 and a second member 404. The first member 402 and second member 404 may be coupled to define the access cover 400.

The first member 402 may include the plate 102. The plate 102 may include curved rims 406. The curved rims 406 may be arranged along one or more edges of the plate 102. For example, the plate 102 may include a pair of the curved rims 406 disposed along first and third edges of the plate 102, where the plate 102 includes a pentagon shape.

The second member 404 may include the L-bend 104, the vertical leg 106, and/or the receiver 108.

The L-bend 104 of the second member 404 may be coupled to the plate 102 of the first member 402. The L-bend 104 of the second member 404 may be coupled to the plate 102 of the first member 402 along one or more edges of the plate 102. For example, the L-bend 104 of the second member 404 may be coupled to the plate 102 of the first member 402 along the second edge of the plate 102, where the second edge is disposed between the first and third edges of the plate 102 along which the pair of the curved rims 406 are disposed.

The L-bend 104 may define through holes 410. For example, the L-bend 104 may define a pair of the through holes 410. The through holes 110 may be a first plurality of through holes and the through holes 410 may be a second plurality of through holes. The through holes 410 defined by the L-bend 104 may be aligned with at least some of the through holes 110 defined by the plate 102. For example, the pair of the through holes 410 may be aligned with a pair of the through holes 110. The L-bend 104 may be coupled to the plate 102 by receiving one or more of the fasteners 212 through the through holes 410 defined by the L-bend 104 and the through holes 110 defined by the plate 102 which are aligned with the through holes 110 defined by the L-bend 104.

The L-bend 104 may define a through slot 408. The through slot 408 may be defined through a thickness of the L-bend 104. The through slot 408 may include any suitable shape, such as, but not limited to, a linear through slot. The linear through slot may follow a straight line along a portion of the length of the L-bend 104. The L-bend 104 may include a pair of ends. The pair of ends may include fillet corners. The L-bend 104 may be a linear through slot with a pair of fillet corners.

The through slot 408 may be disposed adjacent to the plate 102. For example, the through slot 408 may be disposed adjacent to the second edge of the plate 102.

FIGS. 5A-5F illustrate a high voltage system 500, in accordance with one or more embodiments of the present disclosure. The discussion of the high voltage system 200 is incorporated herein by reference as to the high voltage system 500. The high voltage system 500 may include the access cover 400, the housing 202, the power electronics unit 204 (PEU), the electric motor 206, the low voltage plug 208, fasteners 212, and/or the high voltage circuit 214. The fasteners 212 may couple the first member 402 and the second member 404 with the connector housing 216.

The curved rims 406 defined by the plate 102 may receive the connector housing 216. For example, the curved rims 406 defined by the plate 102 may receive the connector housing 216 when the access cover 400 is coupled to the connector housing 216.

The low voltage plug 208 may be connected to the power electronics unit 204 with a cable. The cable connecting the low voltage plug 208 to the power electronics unit 204 may be clipped to the through slot 408 defined by the L-bend 104. For example, the cable connecting the low voltage plug 208 to the power electronics unit 204 may be clipped to the through slot 408 by a retainer clip (e.g., a fir tree retainer clip) or the like.

The high voltage system 500 may also include a delay plate 502. The delay plate 502 may be disposed within the connector housing 216. For example, the delay plate 502 may be disposed within the connector housing 216 between the plate 102 of the access cover 400 and the high voltage circuit 214. The delay plate 502 may be configured to couple and uncouple from the connector housing 216. For example, the delay plate 502 may be coupled to the connector housing 216 by one or more fasteners (not depicted).

The delay plate 502 may cover the high voltage circuit 214 when disposed within the connector housing 216. The delay plate 502 and the access cover 400 may each cover the high voltage circuit 214. Covering the high voltage circuit 214 via the delay plate 502 and the access cover 400 may prevent access to the high voltage circuit 214 via the connector housing 216. Thus, the delay plate 502 and the access cover 400 may control access to the high voltage circuit 214 between the power electronics unit 204 and the electric motor 206.

The delay plate 502 may be uncoupled from the connector housing 216 after uncoupling the access cover 400 from the connector housing 216. The delay plate 502 may cover the high voltage circuit 214 between uncoupling the access cover 400 from the connector housing 216 and uncoupling the delay plate 502 from the connector housing 216. It is contemplated that the delay plate 502 may provide a delay between preventing power from being supplied to the high voltage circuit 214 after uncoupling the low voltage plug 208 from the low voltage connector 218 and providing access to the high voltage circuit 214. The delay may protect from system discharge due to a capacitive charge. The delay may be up to five seconds or more. The delay provided by the delay plate 502 may result from uncoupling the delay plate 502 from the connector housing 216.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for applications.

LIST OF REFERENCE NUMBERS

100 access cover
102 plate
103 top surface
104 L-bend
106 vertical leg
108 receiver
110 through holes
112 through slot
114 raised feature
200 high voltage system
202 housing
204 power electronics unit
206 electric motor
208 low voltage plug
210 motor housing
212 fasteners
214 high voltage circuit
216 connector housing
218 low voltage connector
220 interlock circuit
300 method
310 step
320 step
330 step
340 step
350 step
400 access cover
402 first member
404 second member
406 curved rims
408 through slot
410 through holes
500 high voltage system
502 delay plate

What is claimed:

1. An access cover of a high voltage system, the access cover comprising:
- a first member comprising a plate defining a first plurality of through holes; and
- a second member coupled to the first member, the second member comprising:
  - an L-bend extending from the plate, the L-bend defines a second plurality of through holes, the second plurality of through holes are aligned with at least some of the first plurality of through holes;
  - a vertical leg; and
  - a receiver defining a first through slot, the receiver is offset from the plate, the plate and the receiver define opposing ends of the access cover, the vertical leg extends from the L-bend, the L-bend joins the plate to the vertical leg, the L-bend defines a second through slot through a thickness of the L-bend.

2. The access cover of claim 1, wherein the first through slot is a linear through slot.

3. The access cover of claim 2, wherein the first through slot is the linear through slot with a pair of fillet corners.

4. The access cover of claim 1, wherein the first plurality of through holes are counterbore through holes.

5. The access cover of claim 1, wherein the access cover is stamped aluminum.

6. The access cover of claim 1, wherein the vertical leg is orthogonal to the plate.

7. The access cover of claim 6, wherein the receiver is parallel to the plate and orthogonal to the vertical leg, wherein the second through slot is fully defined by the L-bend.

8. The access cover of claim 6, wherein the vertical leg is an arched surface.

9. The access cover of claim 1, wherein the plate, the L-bend, and the vertical leg include a uniform thickness.

10. The access cover of claim 1, the plate comprising a pair of curved rims disposed along at least two edges of the plate, wherein the L-bend is disposed between the pair of curved rims.

11. The access cover of claim 10, wherein the plate is a pentagon, wherein the pair of curved rims are disposed along a first edge and a third edge of the plate, wherein the L-bend abuts a second edge of the plate.

12. A high voltage system comprising:
- an access cover comprising:

a first member comprising a plate defining a first plurality of through holes; and a second member coupled to the first member, the second member comprising:

an L-bend extending from the plate, the L-bend defines a second plurality of through holes, the second plurality of through holes are aligned with at least some of the first plurality of through holes;

a vertical leg; and a receiver defining a first through slot, the receiver is offset from the plate, the plate and the receiver define opposing ends of the access cover, the vertical leg extends from the L-bend, the L-bend joins the plate to the vertical leg, the L-bend defines a second through slot through a thickness of the L-bend;

an electric motor;

a high voltage circuit; and a housing comprising a connector housing and a low voltage connector, the connector housing houses the high voltage circuit, the first through slot receives the low voltage connector, the plate couples to the connector housing and covers the high voltage circuit.

13. The high voltage system of claim 12, wherein the electric motor is a three-phase electric motor.

14. The high voltage system of claim 12, comprising a plurality of fasteners, wherein the plurality of fasteners couple the access cover to the connector housing through the first plurality of through holes.

15. The high voltage system of claim 12, wherein the low voltage connector is disposed adjacent to the connector housing.

16. The high voltage system of claim 12, comprising a low voltage plug, wherein the low voltage plug couples to the low voltage connector, wherein the receiver couples between the low voltage connector and the low voltage plug thereby preventing uncoupling of the plate from the connector housing;

wherein the low voltage plug is configured to uncouple from the low voltage connector thereby permitting the plate to uncouple from the connector housing.

17. The high voltage system of claim 16, comprising a power electronics unit, wherein the high voltage circuit couples the power electronics unit and the electric motor, the power electronics unit comprising an interlock circuit, wherein the interlock circuit is configured to receive one or more signals from the low voltage connector via the low voltage plug;

wherein the interlock circuit prevents the power electronics unit from supplying power to the high voltage circuit when the low voltage plug is uncoupled from the low voltage connector;

wherein a cable connecting the low voltage plug to the power electronics unit is clipped to the second through slot.

18. The high voltage system of claim 12, wherein the housing comprises a motor housing which houses the electric motor; wherein the connector housing and the low voltage connector extend from the motor housing.

19. The high voltage system of claim 12, comprising a delay plate;

wherein the delay plate is disposed within the connector housing.

20. A method comprising:

uncoupling a low voltage plug from a low voltage connector of a housing, the housing comprises a connector housing and the low voltage connector;

uncoupling a plurality of fasteners from a plate of an access cover and the connector housing, the access cover comprises a first member comprising the plate defining a first plurality of through holes; and a second member coupled to the first member, the second member comprising an L-bend extending from the plate, a vertical leg, and a receiver defining a first through slot, the L-bend defines a second plurality of through holes, the second plurality of through holes are aligned with at least some of the first plurality of through holes, the receiver is offset from the plate, the plate and the receiver define opposing ends of the access cover, the plurality of fasteners are uncoupled from the plate by removing the plurality of fasteners from the first plurality of through holes; and uncoupling the plate from the connector housing to uncover a high voltage circuit housed within the connector housing, the plate is uncoupled from the connector housing in response to uncoupling the low voltage plug from the low voltage connector and in response to uncoupling the plurality of fasteners from the plate and the connector housing.

* * * * *